(12) United States Patent
May

(10) Patent No.: US 7,610,698 B2
(45) Date of Patent: Nov. 3, 2009

(54) APPARATUS FOR EXTRACTING PLANT SPECIE AND A METHOD THEREOF

(76) Inventor: Joseph A. May, P.O. Box 23, Wagon Mound, NM (US) 87752

( * ) Notice: Subject to any disclaimer, the term of this patent is extended or adjusted under 35 U.S.C. 154(b) by 53 days.

(21) Appl. No.: 11/589,428

(22) Filed: Oct. 30, 2006

(65) Prior Publication Data

US 2007/0169802 A1 Jul. 26, 2007

Related U.S. Application Data

(60) Provisional application No. 60/761,835, filed on Jan. 25, 2006.

(51) Int. Cl.
*A01G 23/06* (2006.01)
(52) U.S. Cl. .............................. 37/302; 37/301; 37/446; 144/4.1; 144/34.1; 144/24.12; 144/334; 171/50; 171/62; 171/46; 171/141
(58) Field of Classification Search .................. 37/301, 37/302, 446, 303; 144/334, 4.1, 34.1, 34.6, 144/24.12; 171/62, 111, 50, 46, 105, 141, 171/144

See application file for complete search history.

(56) References Cited

U.S. PATENT DOCUMENTS

| | | | | |
|---|---|---|---|---|
| 1,739,489 A | * | 12/1929 | Wagner | 172/381 |
| 2,066,803 A | * | 1/1937 | Sawyer | 7/114 |
| 2,251,048 A | * | 7/1941 | Garland | 172/372 |
| 2,393,432 A | * | 1/1946 | Turner | 37/444 |
| 2,594,598 A | * | 4/1952 | Timmins | 294/51 |
| 2,633,880 A | * | 4/1953 | Mattson | 144/34.1 |
| 2,642,305 A | * | 6/1953 | Butler | 7/114 |
| 2,821,217 A | * | 1/1958 | Shald | 144/34.1 |
| 2,838,856 A | * | 6/1958 | Buisse | 37/404 |
| 3,033,253 A | * | 5/1962 | Purdy | 144/34.1 |
| 3,557,850 A | * | 1/1971 | Owens et al. | 144/34.6 |
| 3,643,744 A | * | 2/1972 | Turnquist | 172/372 |
| 3,804,138 A | * | 4/1974 | Adcock | 144/34.6 |
| 3,809,135 A | * | 5/1974 | Dove | 144/34.6 |
| 4,094,348 A | * | 6/1978 | Wolf | 144/34.6 |

(Continued)

FOREIGN PATENT DOCUMENTS

DE 015366 2/2005

(Continued)

*Primary Examiner*—Thomas A Beach
*Assistant Examiner*—Matthew R Buck
(74) *Attorney, Agent, or Firm*—James Ray & Assoc.

(57) ABSTRACT

An apparatus for extracting plant species of varying heights and varying diameters adapted to be mounted on a conventional land vehicle includes a frame and an extracting member rigidly attached to and extends outwardly from a bottom edge of the frame. The extracting member includes a first elongated extracting portion having a knife-like free end, a pair of second extracting portions each positioned adjacent a respective edge of the first elongated extracting portion and having a cutting edge formed generally perpendicular to the respective edge of the first elongated extracting portion, and a pair of third extracting portions each connecting an end of the cutting edge of the second extracting portion with a respective end of the bottom edge of the frame. A pair of elongated member are attached to the rear surface of the frame for attaching it to the land vehicle.

15 Claims, 2 Drawing Sheets

U.S. PATENT DOCUMENTS

| | | | | |
|---|---|---|---|---|
| 4,164,247 | A * | 8/1979 | Wolf | 144/34.6 |
| 4,682,638 | A * | 7/1987 | Becker | 144/24.12 |
| D307,100 | S * | 4/1990 | Roman | D8/11 |
| 4,992,020 | A * | 2/1991 | Bartlett | 414/723 |
| 5,111,599 | A * | 5/1992 | DeSalvo et al. | 37/301 |
| 5,901,477 | A | 5/1999 | Weaver | |
| 5,901,479 | A * | 5/1999 | Langdon | 37/444 |
| 5,950,699 | A * | 9/1999 | Dove | 144/34.6 |
| 5,960,891 | A * | 10/1999 | Sheehan et al. | 172/381 |
| 6,308,440 | B1 * | 10/2001 | Mueller | 37/404 |
| 6,401,831 | B2 * | 6/2002 | Bouchard | 171/46 |
| 6,439,279 | B1 * | 8/2002 | Underwood | 144/34.6 |
| 6,578,297 | B1 * | 6/2003 | Forsberg | 37/444 |
| 6,588,127 | B1 * | 7/2003 | Brittian, III | 37/403 |
| 6,662,479 | B2 * | 12/2003 | Chaney | 37/301 |
| 7,104,745 | B2 * | 9/2006 | Ochoa | 414/722 |
| 2003/0122004 | A1 | 7/2003 | Allen et al. | |

FOREIGN PATENT DOCUMENTS

| | | |
|---|---|---|
| EP | 212826 | 3/1987 |
| JP | 002967 | 1/1984 |

\* cited by examiner

APPARATUS FOR EXTRACTING PLANT SPECIE AND A METHOD THEREOF

CROSS-REFERENCE TO RELATED APPLICATIONS

This application is related to and claims priority from Provisional Patent Application Ser. No. 60/761,835 filed Jan. 25, 2006.

FIELD OF THE INVENTION

The present invention relates, in general, to plant specie extracting devices and, more particularly, this invention relates to an apparatus for extracting bushes, shrubs, trees and the like which is adapted to be mounted on a conventional rubber tired or track mounted land vehicle and a method thereof.

BACKGROUND OF THE INVENTION

One problem that is constantly experienced in clearing bushes, shrubs and trees, particularly of cedar and juniper plant species, from cultivated or pasture lands is the ease with which such plant species can re-grow when their root portion is left in the ground. Accordingly, the root portion of such plant species must be extracted from the ground in order to minimize the re-growth. Another problem is related to reduction of the contact area of the clearing equipment with the surrounding soil in order to minimize soil disturbance and preserve valuable grass covering surrounding such plant species.

Efforts have been made to alleviate problems of extracting cedar and juniper plant species. U.S. Pat. No. 5,901,477 issued to Weaver discloses a tree removing device which is designed for mounting on a land vehicle such as a conventional bulldozer or tractor and has a bulldozer-type extracting device fitted with a power extractor for cutting the roots of a tree and a tree jack for levering the tree from the ground after the roots are cut.

The power extractor is characterized by a frame pivoted to the bulldozer-type extracting device and a vertically adjustable carrier mounted in the frame and internally fitted with a hydraulically operated extractor which may be extended into the ground from the carrier to cut the roots of a tree by operation of the land vehicle.

The tree jack includes a jack frame pivoted to the land vehicle bulldozer-type extracting device and a mast attached to the jack frame, which jack frame is fitted at one end with a foot for engaging the tree. The mast includes hydraulic cylinders for both engaging the tree and causing the mast to pivot, thereby jacking the tree from the earth by operation of the jack frame foot. However, the use of hydraulically operated extractor and mast and their support structures increases the manufacturing and maintenance costs and reduces the reliability of the device.

U.S. Pat. No. 5,111,599 issued to DeSalvo et al discloses an implement for uprooting and removing bushes and small trees from pasture land. The device is adapted to be mounted on a tractor having a front end loader assembly and includes a transverse horizontal bar having tooth like projections along its leading edge. The teeth are long and reinforced for greater strength.

Channels are defined by the teeth and shaped to provide narrow openings at the roots of the teeth to grasp small bushes. The wider mouth of each channel between teeth will accommodate larger stems or trunks. Brush is conveniently uprooted and transported by the tractor mounted device. While providing a simpler and more reliable apparatus, DeSalvo failed to resolve the problem of reducing the contact area in order to preserve valuable grass covering surrounding such plant species.

SUMMARY OF THE INVENTION

According to one embodiment, the invention provides an apparatus for extracting plant species of varying heights and varying diameters. The apparatus is adapted to be mounted on a conventional land vehicle. The apparatus includes a frame. An extracting means is rigidly attached to and extends outwardly from a bottom edge of the frame for engaging and extracting such plant specie. The extracting means includes a first extracting portion having a knife-like free end. An attachment means is provided for attaching the frame to such land vehicle.

According to another embodiment of the invention, there is provided an apparatus for extracting plant species of varying heights and varying diameters. The apparatus is adapted to be mounted on a conventional land vehicle. The apparatus includes a frame and an extracting member which is rigidly attached to and extends outwardly from a bottom edge of the frame. The extracting member includes a first elongated extracting portion having a knife-like free end, a pair of second extracting portions each positioned adjacent a respective edge of the first elongated extracting portion and having a cutting edge formed generally perpendicular to the respective edge of the first elongated extracting portion, and a pair of third extracting portions each connecting an end of the cutting edge of the second extracting portion with a respective end of the bottom edge of the frame. An attachment means is provided for attaching the frame to such land vehicle.

According to a further embodiment, the invention provides a method of extracting plant species of varying heights and varying diameters. The method includes the step of providing an apparatus which is attached to a land vehicle and which has an elongated extracting member extending outwardly relative to the land vehicle. Next, positioning, by way of the land vehicle, the elongated extracting member at a predetermined angle relative to a ground surface. Then, inserting a free end of the elongated extracting member into the ground surface and adjacent a root portion of the plant specie. Thrusting, by way of the land vehicle, the elongated extracting member into the root portion and under the plant specie. Finally, lifting, by way of the land vehicle, the elongated extracting member to extract the plant specie portion from the ground surface.

OBJECTS OF THE INVENTION

It is, therefore, one of the primary objects of the present invention to provide an apparatus for extracting bushes, shrubs, trees and the like.

Another object of the present invention is to provide an apparatus for extracting bushes, shrubs, trees and the like which minimizes disturbance of the surrounding soil.

Yet another object of the present invention is to provide an apparatus for extracting bushes, shrubs, trees and the like which is easily mounted on a conventional land vehicle.

A further object of the present invention is to provide an apparatus for extracting bushes, shrubs, trees and the like which is usable on plant species of various heights.

Yet a further object of the present invention is to provide an apparatus for extracting bushes, shrubs, trees and the like which employs stationary members.

An additional object of the present invention is to provide an apparatus for extracting bushes, shrubs, trees and the like which is economical to manufacture.

Another object of the present invention is to provide an apparatus for extracting bushes, shrubs, trees and the like which is simple and reliable to operate.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
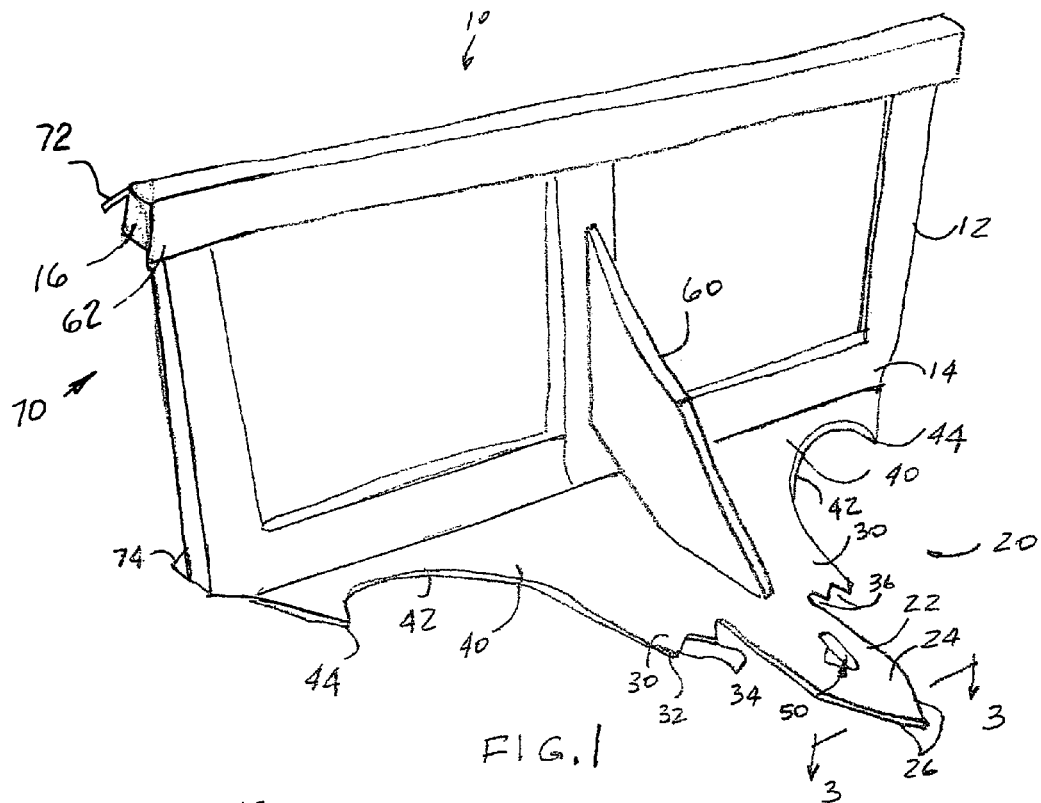
FIG. 1 is a perspective view of an apparatus for extracting bushes, shrubs and trees of the present invention.
Figure 2:
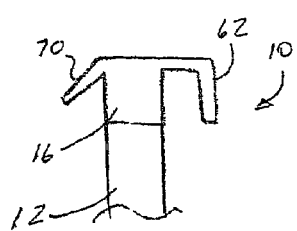
FIG. 2 is a partial side view of the apparatus of FIG. 1, illustrating the attachment and deflection means of the present invention.
Figure 3:
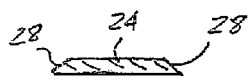
FIG. 3 is a cross-sectional view of the apparatus for extracting bushes, shrubs and trees along lines 3-3 of FIG. 1.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a land carrier applies to any conventional rubber tired or track mounted vehicle capable of carrying a conventional bucket.

Reference is now made, to FIGS. 1-5, wherein there is shown an apparatus, generally designated 10, for extracting a plant specie 4, such as brush, shrubs and trees, of varying diameters. The apparatus 10 is adapted to be mounted on a land vehicle 2.

The apparatus 10 includes a frame 12 having a bottom edge 14 and an opposed top edge 16. The presently preferred width of the frame 12 is about 5 feet.

An extracting means, generally designated 20, is rigidly attached to and extends outwardly from the bottom edge 14 of the frame 12 for engaging and extracting such plant specie 4. It is presently preferred that the extracting means 20 is attached generally perpendicular to the frame 12. The extracting means 20 includes a first portion 22 which is generally elongated and has a knife-like free end 24. The knife-like free end 24 is formed by a pair of side edges 26 which converge to an apex.

Preferably, the knife-like free end 24 is hardened to increase reliability of the apparatus 10. It is further presently preferred for each side edge 26 to include a bevel 28 which is oriented upwardly. The presently preferred first extracting portion 22 is positioned about the mid-point of the bottom edge 14 and has a length of about 4 feet.

An attachment means, generally designated 70, is provided for attaching the frame 12 to such land vehicle 2.

Figure 5:
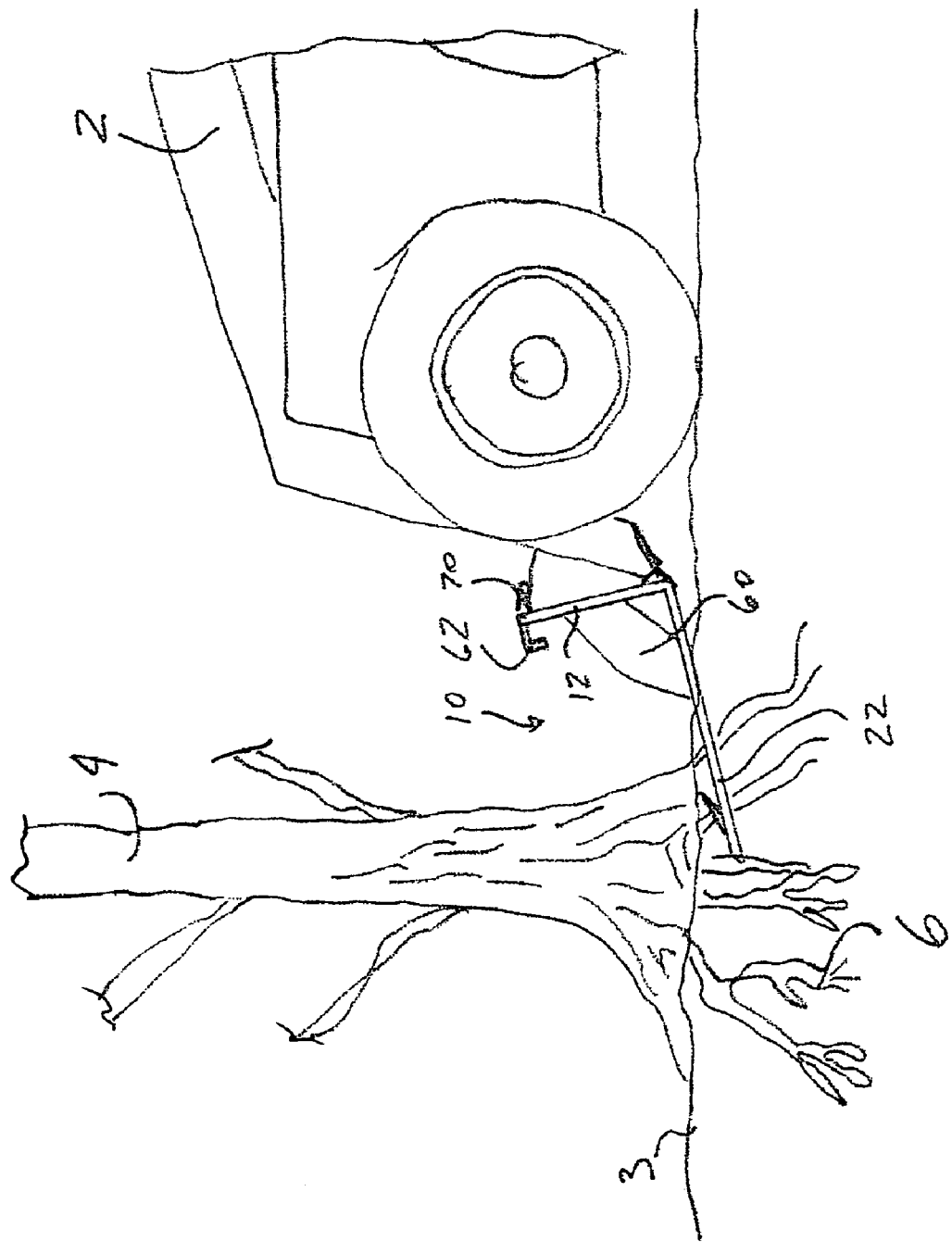
FIG. 5 is a side elevation view of the apparatus of FIG. 1, particularly illustrating the use of such apparatus for extracting bushes, shrubs and trees of the present invention

The operation of the apparatus 10 is best illustrated in FIG. 5. With the first portion 22 being positioned at a predetermined angle to a ground surface 3 and aligned relative to the plant specie 4, the knife-like free end 24 is first inserted into the ground surface 3, adjacent a root portion 6 of the plant species 4, to a depth of about 4 inches to about 8 inches with below the ground surface 3. The first extracting portion 22 is thrust forward by the land vehicle 2 for positioning such first extracting portion 22 within the root portion 6 and under the plant specie 4 and then is lifted upwardly, by the land vehicle 2, to extract the upper root portion 6 from the ground surface 3. It has been found that an angle of about 30 degrees is advantageous for effective extracting of such plant specie 4.

It has been further found advantageous, for cutting plant specie 4 having a height of less than about 4 feet, for the extracting means 20 to further include at least one and preferably a pair of second extracting portions 30 each positioned adjacent a respective edge of the first portion 22 and having a cutting edge 32 which is formed generally perpendicular to the respective edge of the first extracting portion 22. The cutting edge 32 is positioned about the mid-point of the first extracting portion 22. Such cutting edge 32 may be straight, but preferably, the cutting edge 32 includes a plurality of pointed tooth-like projections 34 disposed in side by side relation and having first and second tapered elongated side edges with the ends of the side edges of adjacent tooth-like projections converging so as to form V-shaped openings 36 between the adjacent tooth-like projections 34.

After the knife-like free end 24 has been inserted into the ground surface and the first extracting portion 22 is thrust forward, cutting edge 32 is positioned to engage root portion 6. Employment of the pair of second extracting portions 30 is advantageous for ease of positioning the extracting means 20 relative to the plant specie 4 and for increasing the extraction rate.

It has been found that for extracting plant specie 4 having a height of between about 4 feet to about 10 feet, it is advantageous for the extracting means 20 to additionally include at least one and preferably a pair of third extracting portions 40 each connecting an end of the cutting edge 32 of the second extracting portion 30 with a respective outer end of the bottom edge 14 of the frame 12.

Preferably, each third extracting portion 40 has a curvilinear outer edge 42 complementing the generally round shape of the root portion 6. By employing such pair of third extracting portions 40, the first extracting portion 22 is laterally spaced from the plant specie 4 at a distance which is sufficient for one of such pair of third extracting portions 40 to directly engage the root portion 6.

Then, the frame 12 is tilted toward the plant specie 4. Next, the knife-like free end 24 is inserted into the ground surface 3. The first extracting portion 22 is thrust forward by the land vehicle 2 enabling the third extracting portion 40 to engage the root portion 6. Finally, the apparatus 10 is simultaneously lifted upwardly and pushed forward by the pressure generated by the land vehicle 2 to extract the root portion 6 from the ground surface 3 and tilt the plant specie toward the ground surface 3. Employment of the pair of third extracting portions 40 is further advantageous for ease of positioning extracting means 20 relative to the plant specie 4 and for increasing the extraction rate by reducing movements of the land vehicle 2.

Figure 4:
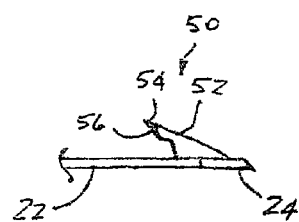
FIG. 4 is a partial side view of the apparatus of FIG. 1, illustrating the root damaging means of the present invention.

To extract a larger plant specie 4 having a height of greater than 10 feet, the present invention contemplates for the extracting means 20 to include means, generally designated 50 and best shown in FIG. 4, which is rigidly attached to an upper surface of the first extracting portion 22 and adjacent the knife-like free end 24 thereof for damaging the root portion 6.

It is presently preferred, for such root damaging means 50 to include an elongated member 52 which is disposed at a predetermined angle relative to the upper surface of the first portion 22 and oriented toward the frame 12. The distal end 54 of such elongated member 52 includes a bevel 56 which is preferably oriented toward the upper surface of the first extracting portion 22.

The apparatus 10 may include an optional pair of pointed teeth 44 each formed at a respective distal end of the third extracting portion 40 and adjacent the respective end of the bottom edge 14 of the frame 12. Such tooth 44 is advantageous for positively engaging the root portion 6 during extracting effort.

In operation, the knife-like free end 24 is inserted into the root portion 6 and the root damaging means 50 is first employed to break-up root portion 6 with the land vehicle 2 moving in a reverse direction. The frame 12 is pressed against the plant specie 4 to test it for movement. If forward movement of the plant specie 4 is not detected, the operator of the land vehicle 2 continues to break-up root portion 6 by reversing the direction of motion of such land vehicle 2.

When movement of the plant specie 4 is detected, the apparatus 10 is simultaneously lifted upwardly and pushed forward by the pressure generated by the land vehicle 2 to extract the root portion 6 from the ground surface 3 and tilt the plant specie 4 toward ground surface 3. If required, limbs of the plant specie 4 may be removed prior to break up of the root portion 6. The bottom surface of the extracting means 20 and the bottom edge 14 of the frame 12 is then used to level the disturbed ground surface 3.

The present invention further contemplates that the root damaging means 50 may be employed for breaking up the root portion 6 of the plant specie 4 having the height of between about 4 feet to about 10 feet.

The apparatus 10 may be adapted with a vertically positioned reinforcing rib 60 which is attached to the upper surface of the first portion 22 and a front surface of the frame 12 and which is also advantageous in aiding the extraction of the larger plant specie 4 having the height of greater than about 10 feet. Furthermore, a deflector means 62 may be attached to the upper edge 16 of the frame 12 for deflecting such lager plant species 4 away from the land vehicle 2.

When such land vehicle 2 is a well known skid-steer loader 2, such attachment means 70 includes a first elongated member 70 which is attached at a predetermined angle to a rear surface of the frame 12 and adjacent the upper edge 16 thereof and a second elongated member 74 which is attached to the rear surface of the frame 12 adjacent the bottom edge 14 for engaging the implement attachment portion of the skid-steer loader 2 in a conventional manner.

It will be understood that the apparatus 10 constructed according to the present invention is economical to manufacture and is reliable and simple to operate. Furthermore, the employment of the elongated first extracting portion 22 minimizes disturbance of the surrounding ground surface and soil.

Although the present invention has been shown in terms of the apparatus 10 used with a conventional skid-steer loader, it will be apparent to those skilled in the art, that the present invention may be applied to other conventional rubber tired or track mounted vehicle 2 which is capable of carrying a conventional bucket (not shown) which is well known in the art.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus for extracting plant species of varying heights and varying diameters which is adapted to be mounted on a conventional land vehicle, said apparatus comprising:
    (a) a frame;
    (b) an extracting means rigidly attached to and extending outwardly from a bottom edge of said frame for engaging and extracting such plant specie, said extracting means including an elongated first extracting portion having each of an upper substantially flat surface, an opposed bottom substantially flat surface, a pair of substantially parallel side edges and a generally pointed free end formed by a pair of converging end portions of said side edges, and a pair of second extracting portions disposed within and coplanar to each plane formed by said upper and bottom substantially flat surfaces of said elongated first extracting portion, each of said pair of second extracting portions having a cutting edge thereof disposed substantially perpendicular to a respective side edge of said elongated first extracting portion, said cutting edge having a plurality of triangular-shaped cutting teeth; and
    (c) an attachment means for attaching said frame to such land vehicle.

2. The apparatus, according to claim 1, wherein said extracting means further includes at least one third extracting portion connecting an end of said cutting edge of said second extracting portion with a respective end of said bottom edge of said frame.

3. The apparatus, according to claim 2, wherein said third extracting portion has a curvilinear outer edge.

4. The apparatus, according to claim 2, wherein said extracting means further includes at least one tooth formed at an end of said third extracting portion which is disposed adjacent said respective end of said bottom edge of said frame.

5. The apparatus, according to claim 1, wherein said extracting means further includes a pair of third extracting portion each connecting an end of said cutting edge of said second extracting portion with a respective end of said bottom edge of said frame.

6. The apparatus, according to claim 1, wherein said extracting means further includes means rigidly attached to an upper surface of said first extracting portion and adjacent said free end thereof for damaging a root portion of such plant specie, wherein said root damaging means includes an elongated member which is disposed in a vertical plane at a first angle relative to said upper surface, said elongated member having a first end thereof secured to said upper surface and having a free second end thereof oriented toward said frame.

7. The apparatus, according to claim 6, wherein said elongated member includes a bevel formed in said free second end thereof and disposed at a second angle relative to said upper surface of said first extracting portion.

8. The apparatus, according to claim 1, wherein said apparatus further includes a vertically positioned reinforcing rib having each of a first end thereof attached to said upper surface of said first extracting portion and an opposed second end thereof attached to a front surface of said frame.

9. The apparatus, according to claim 8, wherein said first end of said reinforcing rib is positioned on said elongated first extracting portion mediate said free end thereof and said front surface of said frame in general alignment with said cutting edge of said second extracting portion.

10. The apparatus, according to claim 1, wherein said apparatus further includes a deflector means attached to an upper edge of said frame for deflecting such plant specie away from such land vehicle.

11. The apparatus, according to claim 1, wherein each end portion of said side edge is beveled.

12. The apparatus, according to claim 1, wherein such at land vehicle is a skid-steer loader and such attachment means includes a first elongated member which is attached at a predetermined angle to a rear surface of said frame and adjacent an upper edge thereof and a second elongated member which is attached to said rear surface of said frame and adjacent said bottom edge thereof for engaging an implement mounting portion of such skid-steer loader.

13. In combination with a land vehicle an apparatus for extracting plant species of varying heights and varying diameters, said apparatus comprising:
    (a) a frame;
    (b) a one-piece extracting member having a pair of major substantially planar surfaces, said member rigidly attached to and extending outwardly from a bottom edge of said frame, said extracting member including:
        (i) an elongated first extracting portion having a free end defined by a pair of side edges of said first elongated extracting portion having end portions thereof converging to an apex,
        (ii) a pair of second extracting portions each positioned adjacent a respective side edge of said elongated first extracting portion and having a cutting edge positioned generally perpendicular to said respective side edge of said elongated first extracting portion, said cutting edge formed by a plurality of projections disposed in side by side relationship, each of said plurality of projections having first and second tapered elongated side edges converging to each other so as to form a generally sharp outer end and diverging from each other as to form V-shaped openings between said adjacent tooth-like projections,
        (iii) a pair of third extracting portions each connecting an end of said cutting edge of said second extracting portion with a respective end of said bottom edge of said frame and having a concave curved outer edge, and
        (iv) a pair of teeth each formed at a respective end of said third extracting portion disposed adjacent said respective end of said bottom edge of said frame and pointed in a direction of said free end of said first extracting portion; and
    (c) an attachment means for attaching said frame to such land vehicle.

14. A method of extracting plant species of varying heights and varying diameters, said method comprising the steps of:
    (a) attaching an apparatus of claim 1 to a land vehicle;
    (b) positioning, by way of said land vehicle, said elongated extracting member at a predetermined angle relative to a ground surface;
    (c) inserting a free end of said elongated extracting member into said ground surface and adjacent a root portion of said plant specie;
    (d) inserting, by way of said land vehicle, a free pointed end of said elongated extracting member into said root portion and under said plant specie;
    (e) inserting, by way of said land vehicle, at least one of said pair of cutting edges into said root portion of said plant specie after said free end of said elongated extracting member is inserted thereinto;
    (f) testing for movement of said plant specie; and
    (g) lifting, by way of said land vehicle, said elongated extracting member to extract said root portion from said ground surface when said plant specie movement is detected in step (f).

15. In combination with a land vehicle an apparatus for extracting plant species of varying heights and varying diameters, said apparatus comprising:
    (a) a frame;
    (b) a one-piece extracting member having a pair of major substantially planar surfaces, said member rigidly attached to and extending outwardly from a bottom edge of said frame, said extracting member including:
        (i) an elongated first extracting portion having a free end defined by a pair of side edges of said first elongated extracting portion having outer end portions thereof converging to an apex,
        (ii) a pair of inwardly curvilinear continuous cutting edges, each of said pair of inwardly curvilinear continuous cutting edges having a first end and having an opposed second end thereof disposed on a respective end of said bottom edge of said frame, and
        (iii) a pair of cutting edges, each of said pair of cutting edges disposed on a respective first end of said inwardly curvilinear continuous cutting edge coplanar with and substantially perpendicular to an inner end portion of a respective side edge of said first extracting portion and having a plurality of cutting teeth,
        (iv) a pair of cutting teeth, each of said pair of cutting teeth disposed at a respective second end of said inwardly curvilinear continuous cutting edge and pointed in a direction of said free end of said first extracting portion; and
    (c) an attachment means for attaching said frame to such land vehicle.

* * * * *